United States Patent [19]

Jones et al.

[11] 3,769,967

[45] Nov. 6, 1973

[54] PULMONARY INHALATION DEVICE

[76] Inventors: George R. Jones, 135 W. Dickenson St., San Diego, Calif.; James F. Dunn, 2014 Broadway; Glenn R. Purdum, 1360 Montgomery St., both of San Francisco, Calif.

[22] Filed: July 7, 1970

[21] Appl. No.: 52,977

[52] U.S. Cl............. 128/2.08, 128/2 A, 250/106 T
[51] Int. Cl.............................................. A61b 5/08
[58] Field of Search...................... 128/1.1, 2 A, 2 R, 128/2.08, 2.07, 145.8, 145, 145.5, 142.2, 184, 172, 187; 250/43.5 R, 106 T, ; 424/1

[56] References Cited
UNITED STATES PATENTS

| | | | |
|---|---|---|---|
| 3,082,761 | 3/1963 | Engelder............................ | 128/2.07 |
| 3,527,206 | 9/1970 | Jones................................ | 128/2.08 |
| 3,527,205 | 9/1970 | Jones................................ | 128/2.08 |
| 2,792,828 | 5/1957 | Engelder............................ | 128/2.07 |
| 2,933,082 | 4/1960 | Billin................................. | 128/2.07 |
| 3,533,398 | 10/1970 | Jones.............................. | 128/2.08 X |
| 3,418,471 | 12/1968 | Gydesen......................... | 128/2 A X |

OTHER PUBLICATIONS
Nature, Sept. 18, 1965, Vol. 207, pp. 1310–1311.

*Primary Examiner*—Kyle L. Howell
*Attorney*—Schapp and Hatch

[57] ABSTRACT

A device for use in making pulmonary studies involving the breathing into the lungs of radioactive tagged gasses. A face mask is attached to the distal end of an arm which is pivotally supported by a cabinet for adjusting the position of the mask. Conduits are provided in the arm for radioactive tagged gas, reservoir air and exhaust. These conduits communicate with a bellows located in the upper part of the cabinet and constituting part of a recirculating system for the radioactive tagged gas. A valving system is located in a valving head on the end of the arm in close proximity to the mask, with the valving head being formed with a plurality of passages and a plurality of demand-responsive one-way valves interconnecting the passages. Remote control means is provided for selectively holding the valves closed and permitting them to open in a desired sequence, which may be programmed for automatic cycling. Measurement of the volume of tagged gas breathed in by the subject from the recirculating system is accomplished by measuring the expansion and contraction of the bellows, such measurement being accomplished by a rack and pinion gear operating a multiturn potentiometer. The arm is pivoted on the cabinet to permit swinging movement, and the arm is rotatable so the swinging movement may be either in a vertical or horizontal plane. Additionally, means is provided for raising and lowering the entire arm assembly. The described movements of the arm are accomplished by worm gear assemblies which also serve to lock the arm in the desired position.

8 Claims, 13 Drawing Figures

INVENTORS
GEORGE R. JONES
JAMES F. DUNN
GLENN R. PURDUM, JR.
BY Schapp & Hatch
ATTORNEYS

INVENTORS
GEORGE R. JONES
BY JAMES F. DUNN
GLENN R. PURDUM, JR.
Schapp & Hatch
ATTORNEYS

INVENTORS
GEORGE R. JONES
JAMES F. DUNN
GLENN R. PURDUM, JR.
BY Schapp & Hatch
ATTORNEYS

INVENTORS
GEORGE R. JONES
JAMES F. DUNN
BY GLENN R. PURDUM, JR.
Schapp & Hatch
ATTORNEYS

PULMONARY INHALATION DEVICE

BACKGROUND OF THE INVENTION

This invention relates to a pulmonary inhalation device, and more particularly to apparatus for making pulmonary ventilation studies involving the use and measurement of radioactive tagged gases.

The functional use of gamma-emitting radioactive gases in diagnostic studies of pulmonary functions has been positively established in the laboratory, and a need has arisen for a device capable of performing various pulmonary function tests, such as controlled delivery of amounts and types of gases — radioactive and/or inert — and the subsequent recovery and disposal of these gases. For flexibility in performing various different tests, the apparatus should provide the capability for mixing, rebreathing and exhausting of such gases in a programmed manner.

SUMMARY OF THE INVENTION

The pulmonary inhalation device of the present invention is widely versatile in its capabilities for performing ventilation studies of the lungs. The necessary gases are supplied to the subject in the correct amounts and the in the correct sequence for the particular study being undertaken, so as to provide optimal and reproducible results. For example, in the making of radioactive regional ventilation studies, radioactive tagged gas is breathed into the lung and a record of the size, shape and location of internal lung passages is made with a radioactive particle counting device such as a scintillation camera.

The desired gases are administered to the subject through a face mask, with the kind and quantity of gas being selected by a remote controlled valving head located in close proximity to the mask to minimize the volume of the passages from the valving head to the mask. The various gases are supplied to the valving head through suitable conduits from sources located within the main cabinet of the device.

The mask is adjustable to accommodate different positions of the subject, and for this purpose the mask and valving head are carried on the distal end of a movable arm, with the conduits being contained within the arm. A pivotal connection is provided to permit swinging movement of the arm, and the pivotal connection is rotatable so the arm may be swung selectively through both vertical and horizontal planes. Additionally, the entire arm assembly, and its pivotal connection, may be moved up and down vertically, the various movements of the arm being accomplished by worm gear devices which automatically lock the parts in the selected position. When not in use, the arm and valve head are retracted into a recess in the cabinet for compactness and protection against accidental damage.

In certain types of pulmonary function tests, it is desirable to have the subject rebreathe the radioactive tagged gas. For this purpose, the present device incorporates a recirculating system for radioactive gases with is capable of recording the volume breathed in by the subject and subsequently returned to the system. The device likewise incorporates a reservoir of non-radioactive gas, and is capable of recording the quantity of such gas breathed in by the subject. Basically, these functions are accomplished by interpositioning an expandable bellows in the radioactive gas recirculating system, providing the reservoir for non-radioactive gas in the form of a smaller bellows mounted inside of the other bellows, and providing means for measuring and recording the expansion and contraction of the outer bellows.

It is therefore a principal object of the present invention to provide a pulmonary inhalation device capable of performing a variety of pulmonary function tests involving controlled delivery and recovery of various amounts and types of gases, including radioactive tagged gases.

Another object of the invention is to provide a device of the character described in which accurate measurement may be made of the quantities of such gases inhaled and exhaled by the subject.

A further object of the invention is to provide a device of the character described which provides for programmed sequencing to allow mixing, rebreathing and exhausting of such gases in a desired manner consistent with the particular test being undertaken.

A still further object of the invention is to provide a device of the character described which is self-contained, with the various components interconnected and cooperative to provide a compact, portable unit.

Another object of the present invention is to provide a pulmonary inhalation device incorporating a radioactive gas recirculating system incorporating an expandable bellows and a volumetric readout device responsive to expansion and contraction of the bellows.

Yet another object of the present invention is to provide a pulmonary inhalation device of the character described in which the valving functions relating to the different gases may be programmed to provide various desired sequences of operation.

Other objects and features of advantage will become apparent as the specification progresses, and from the claims appended hereto.

While only the preferred form of the invention has been shown in the drawings, it will be apparent that changes and modifications could be made thereto within the ambit of the invention as defined in the claims hereto.

DESCRIPTION OF THE PREFERRED EMBODIMENTS

Referring to the drawings in detail, it will be seen that the pulmonary inhalation device of the present invention includes conduits 21, 22 and 23 adapted for connection to a source 24 of radioactive tagged gas, a reservoir 26 of non-radioactive gas, and an exhaust line 27, the conduits being connected through a valving head 28 to a mask 29 adapted to fit over the face of a subject 31 with the interior of the mask in sealed communication with the breathing passages of the subject.

As here shown, the various components are supported by a cabinet 32 mounted on a base 33 supported on casters 34 for movement from place to place. The middle portion of cabinet 32 is hollow to provide a storage area for one or more tanks of gases and other associated equipment to be used in the pulmonary studies.

Figure 1:
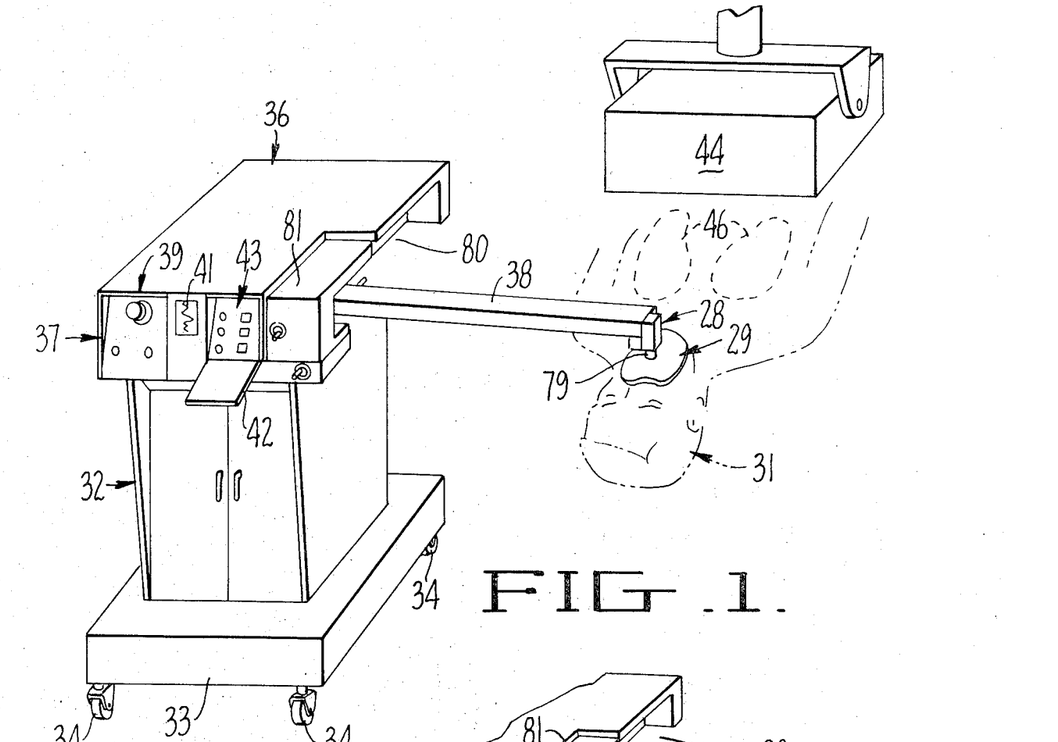
FIG. 1 is a perspective view of a pulmonary inhalation device constructed in accordance with the present invention and shown in operative position with respect to a subject to be tested.

Mounted on the storage section 32 of the cabinet is an enlarged, flat, box-shaped unit 36 providing an operating panel 37 and supporting an adjustable arm 38 which carries the valving head 28 and mask 29 at its distal end. At the left side of panel 37, as viewed in FIG. 1, are manual controls 39, and adjacent to these is mounted the viewing window of a small inkless recorder 41. Next to the recorder 41 is a door 42 which may be swung downwardly to reveal controls 43 for programming the sequence of operation of the device.

As shown in FIG. 1, the subject will often be in a supine position, with the radioactivity detecting apparatus 44 mounted in position over the chest and lungs 46 of the subject 31. The mask 29 may comprise any suitable device for effecting sealed communication of the valving head 28 with the breathing passages of the subject and may be in the form of a mask fitting over the nose and mouth, as here shown, or a mouthpiece and nose clip, or other suitable device, the term "mask" here being used generically to designate any such apparatus.

In accordance with the present invention, the mask 29 may be positioned at various heights and angles to place it in the most comfortable and effective position relative to the face of the subject 31. For this purpose, the arm 38 is movable with respect to the cabinet 32, and mask 29 is movable relative to arm 38, the latter movement being provided by a conventional swivel or flexible connection between mask 29 and valve head 28.

Figure 4:
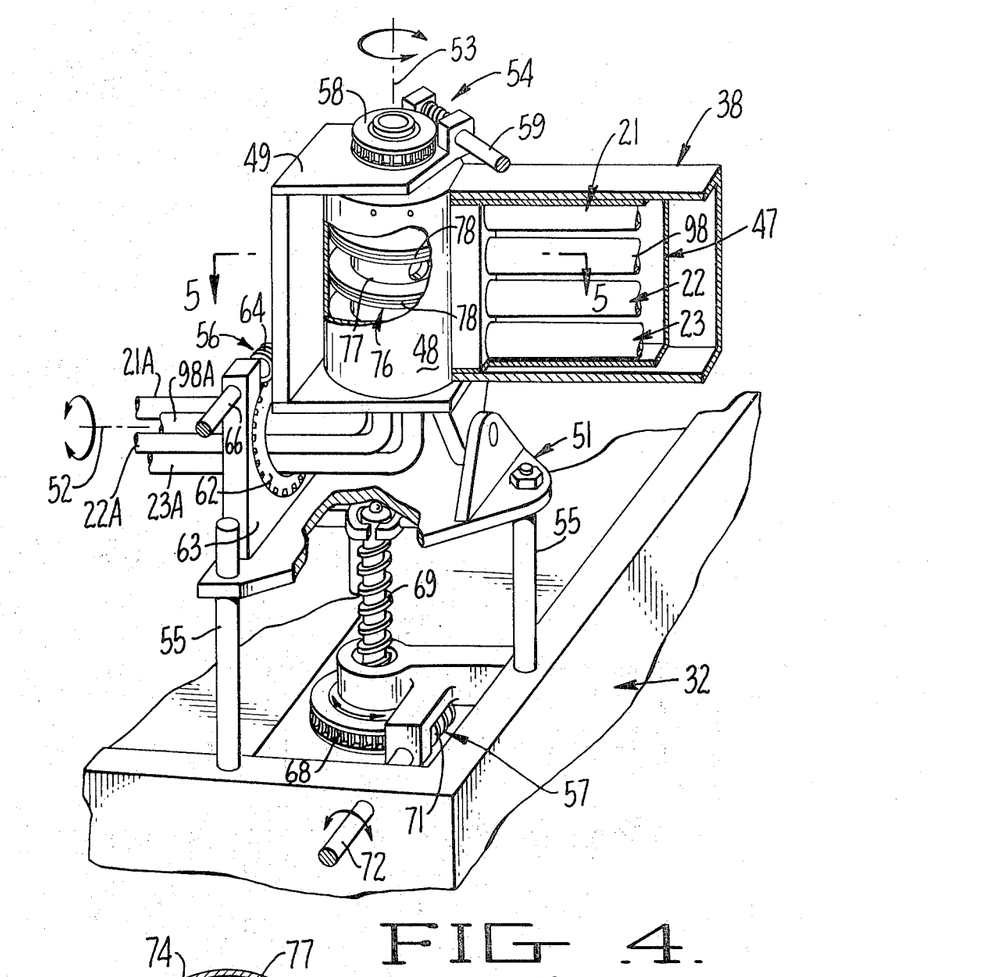
FIG. 4 is an enlarged perspective view, with portions broken away and shown in section for clarity of the details of the connection of the adjustable arm to the rest of the device.

As may best be seen in FIG. 4 of the drawings, the operative connection between arm 38 and cabinet 32 is formed to permit swinging movement of the arm 38 in both horizontal and vertical planes and to provide vertical adjustment of the entire arm assembly. Arm 38 is of hollow construction and contains conduits 21, 22 and 23, a lead shield 47 preferably lining arm 38 to attenuate any radiation from materials passing through the conduits.

Arm 38 is attached to a knuckle joint 48 which permits pivotal, swinging movement of arm 38 while still providing constant communication between conduits 21, 22 and 23 in arm 38 and their extensions 21A, 22A, and 23A leading into interior of cabinet 32.

Knuckle joint 48 is journaled in a bracket 49 for swinging movement relative thereto. Bracket 49, in turn, is supported for swinging movement relative to cabinet 32 about an axis 52 perpendicular to axis 53 of knuckle joint 48.

Bracket assembly 51 is supported for vertical movement relative to cabinet 32 on guide rods 55 in uch manner that vertical movement of bracket assembly 51 will move knuckle joint 48 and arm 38 vertically with the bracket assembly.

In accordance with the invention, mechanical means is provided for effecting the described swinging and vertical movements, and for locking the parts in adjusted position. As here shown, this mechanical means consists of worm gear assemblies 54, 56 and 57 to effect pivotal movement around axes 53 and 52 and vertical movement of bracket assembly 51, respectively.

Worm gear assembly 54 has its pinion gear 58 connected for joint movement to arm 38, and is actuated by shaft 59, on which is mounted a manually engagable handle 61.

In order to provide the desired movement and afford communication of conduits 21A, 22A, and 23A through worm gear assembly 56, the pinion gear 62 has its center cut out to provide a passageway for the conduits, and gear 62 is journaled in a circular cutout formed in an upstanding plate 63 which is part of bracket assembly 51. Worm gear 64 is operated by shaft 66 having a manually engagable handle 67 at its outer end.

Worm gear assembly 57 has its pinion gear 68 journaled on cabinet 32 and connected to a screw jack 69 operatively connected to vertically movable bracket assembly 51. The worm gear 71 is operated by shaft 72 journaled in cabinet 32 and having a manually engagable handle 73 at its outer end.

Figure 5:
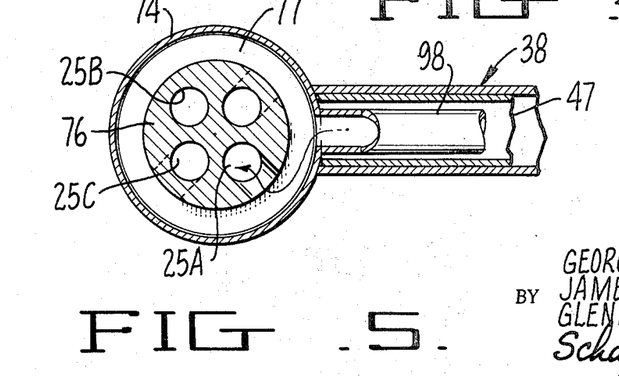
FIG. 5 is a fragmentary cross-sectional view taken substantially on the plane of line 5—5 of FIG. 4.

FIGS. 4 and 5 illustrate the internal structure of knuckle joint 48. As there shown, arm 38 is secured to a cylindrical housing 74, which then swivels around a spool member 76 attached to bracket 49. Spool member 76 is provided with peripheral grooves 77 which register with the open inner ends of the conduits carried in arm 38, and which are separated by slidable seals such as O-rings 78. Conduits 21A, 22A and 23A communicate with vertically extending holes 25A, 25B and 25C, which open into grooves 77 aligned with arm conduits 21, 22 and 23, respectively.

Figure 2:
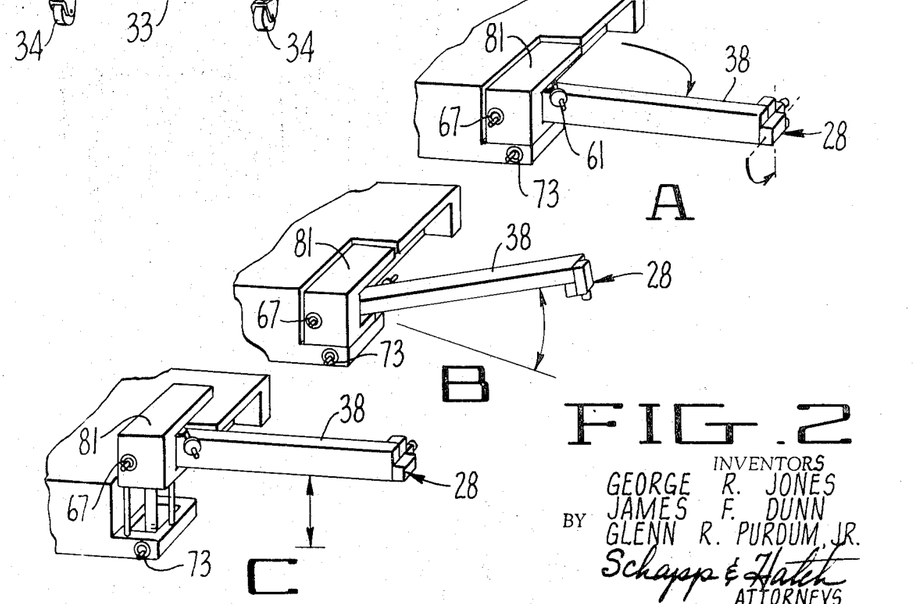
FIG. 2A is a fragmentary perspective view of a portion of the device of FIG. 1 illustrating adjustment movement of an arm forming a portion of the device.
FIG. 2B is a view similar to that of FIG. 2A, but showing the arm in a different position.
FIG. 2C is a view similar to that of FIGS. 2A and 2B, but illustrating the arm in a raised position.

As may be seen from FIG. 2 of the drawings, the structure illustrated in FIG. 4 of the drawings permits swinging movement of the arm around knuckle joint 48, and the rotation of the arm made possible by the pivotal mounting of knuckle joint 48 on bracket assembly 51 permits swinging movement of arm 38 in a horizontal plane (FIG. 2A) or a vertical plane (FIG. 2B). Obviously, arm 38 may be swung through a plane at any angle to the horizontal, should such be desired. Vertical movement of the entire arm assembly is provided by screw jack 69, as indicated in FIG. 2C of the drawings. These various movements make it possible to position the valving head 28 and associated mask 29 to suit the attitude of the subject, and mask 29 is connected to valving head 28 by a flexible or swivel joint 79 to complete the flexibility of adjustment.

As a feature of the invention, the movable mounting of arm 38 on cabinet 32 makes it possible to retract the arm into a storage recess 80 provided in the side of cabinet member 36 adjacent to a housing 81 which contains the mechanism illustrated in FIG. 4. With arm 38 retracted into storage recess 80, valving head 28 and arm 38 are protected against accidental damage, and the unit is made more compact.

Figure 6:
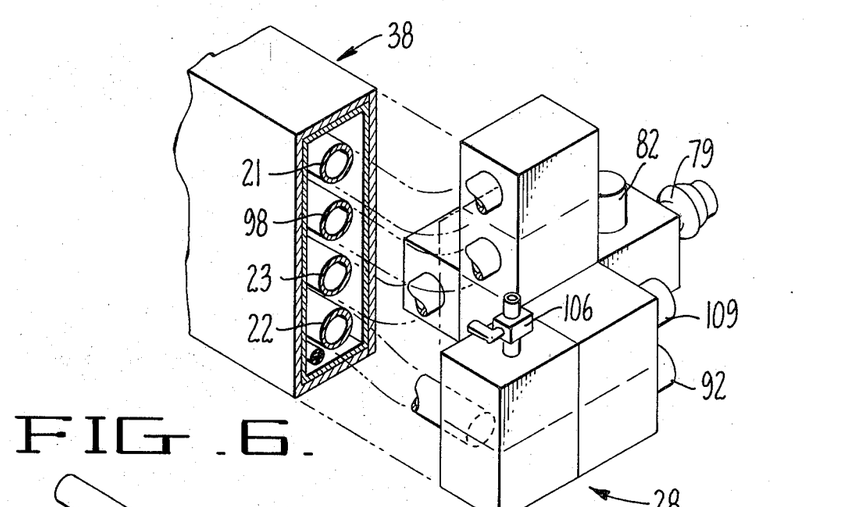
FIG. 6 is an isometric view of a valving head forming part of the present invention and shown in operative association with a fragmentary portion of its supporting arm and the conduits contained therein.
Figure 7:
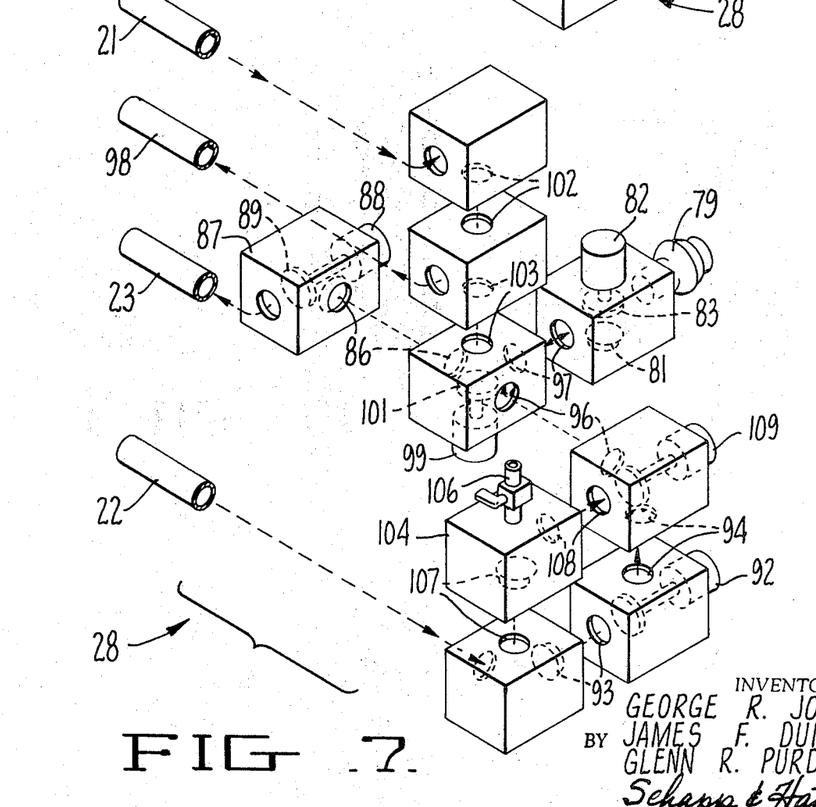
FIG. 7 is an isometric exploded view of the valving head of FIG. 6.

In accordance with the present invention, the valving head 28 is constructed to provide minimal passage length between the valves and the mask 29. For this purpose, the valving head is located on the distal end of arm 38, a short connection is provided to mask 29, and the valving head is fabricated as a close-coupled, block-on-block structure, which may best be seen in FIGS. 7 through 11 of the drawings. The valving head unit 28 is illustrated in FIG. 6 in its operative position relative to arm 38, with the connection of the valving head to the arm, and the connection of the various ports to their respective conduits being shown in phantom lines. FIG. 7 is an exploded view of the valving head of FIG. 6 illustrating the block-on-block construction.

The positioning of the valves to effect a desired connection of the face mask to one or more of the conduits, or to ambient air is illustrated in FIGS. 8 through 11 of the drawings, wherein the operative portions of the valving head to accomplish the particular result are shown in solid lines, with portions broken away to reveal internal structure, while the rest of the valving head is illustrated in phantom lines.

As here shown, each of the blocks is hollow, but it should be understood that in actual practice the blocks will be solid and passages will be formed therein which are of minimum size to accomplish to described results. Preferably, the valves are generally of the one-way demand-operated type and consist of a flat valve member, such as valve member 81 of FIG. 8, which is adapted to move to open position in response to reduction in pressure on one side of the valve and to move to closed position when pressure increases on that side of the valve to equal or surpass the pressure on the other side of the valve.

Figure 8:
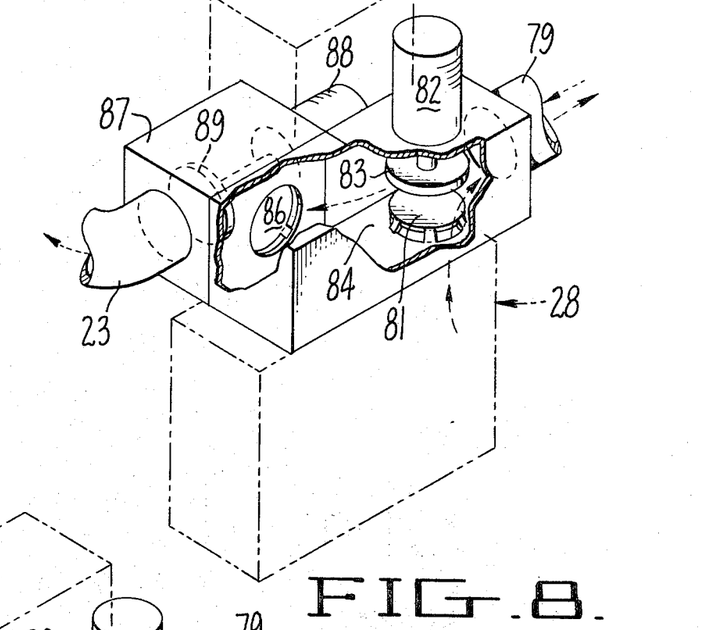
FIG. 8 is an isometric view of a component assembly of the valving head of FIG. 6, with portions broken away and shown in section to reveal internal detail, the associated portions of the valving head being indicated in phantom.

Each of the valves is controlled by a solenoid, such as solenoid 82 in FIG. 8, which normally urges a disk 83 against valve member 81 to displace the latter to its closed position, but which retracts away from valve member 81 when the solenoid 82 is energized, thus allowing valve member 81 to move to open position upon demand, such as reduction in pressure in chamber 84, as would be caused by connecting chamber 84 to mask 29 when the subject 31 is inhaling.

FIG. 8 illustrates the operation of the valving unit to supply fresh ambient air through connection 79 to mask 29 during inhalation by the subject, and returning exhaled air to the exhaust conduit 23. Here, solenoid 82 is energized to retract disk 83 and permit valve member 81 to open upon demand caused by the subject inhaling through connection 79. Opening of valve member 81 communicates chamber 84 with the outside, ambient atmosphere, allowing fresh air to enter and be drawn into the lungs of subject 31.

Exhalation by subject 31 closes valve 81 and opens valve 86, which is also in communication with passage 84. Opening of valve 86 allows the exhaled air to pass through the passage in block 87 and out to exhaust through conduit 23, solenoid 88 being energizd to retract disk 89 which, in this particular case, itself acts as a valve member controlling entry of gases into exhaust line 23.

Figure 9:
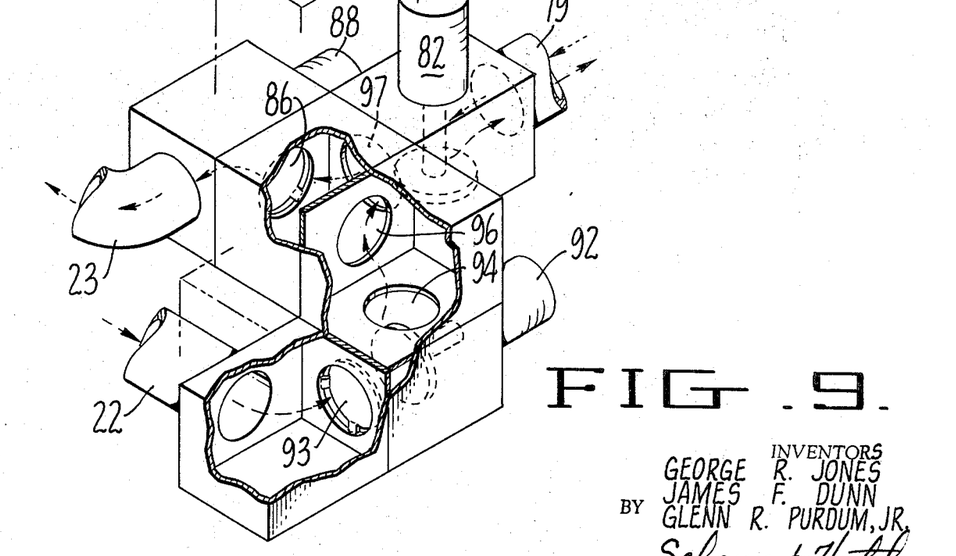
FIG. 9 is a view similar to that of FIG. 8, but showing a different component assembly of the valving head.

FIG. 9 illustrates the valving arrangement wherein air is allowed to be drawn from a reservoir 91 through conduit 22 into the lungs of the subject, and this exhaled air passes back to the exhaust conduit 23. As here shown, solenoid 82 is de-energized, closing valve member 81, and solenoid 92 is energized to permit valve member 93 to open under the demand of an inhalation by the subject 31. Air from reservoir 91 then passes through valve 93, port 94, port 96, port 97 and connection 79 to mask 29. The exhaled air passes through valving head 28 to exhasut conduit 23 in the same manner as illustrated in FIG. 8 and described above, solenoid 88 again being energized for this purpose.

Figure 10:
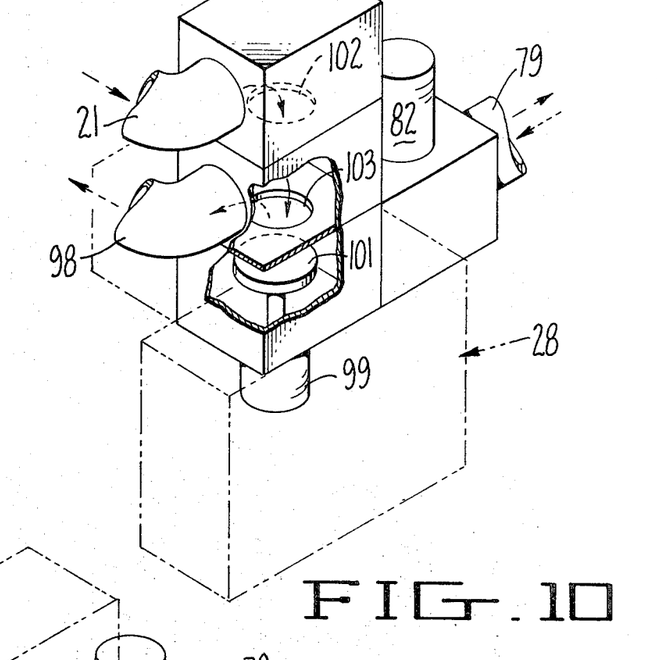
FIG. 10 is a view similar to that of FIGS. 8 and 9, but showing another component assembly.

FIG. 10 illustrates the operation of the valving head 28 to provide for inhalation of radioactive tagged gas from conduit 21 and exhalation of this gas to a return conduit 98, also preferably contained in arm 38 along with conduits 21, 22 an 23. To accomplish the described action, solenoid 99 is energized to retract disk 101 which, in this instance, serves as a valve member. Inhalation by the subject draws radioactive tagged gas from conduit 21 through one-way, demand-responsive valve 102, through port 103, normally closed by vlave member 101, through opening 98 (see FIG. 9) and to the subject through connection 79. The exhaled gas passes through port 97, valve opening 103 and into hot gas return line 98.

In some types of pulmonary studies, it is desirable to make the radioactive study in a hot bolus, or a single breath hold. In this type of procedure, a small quantity of radioactive gas is injected into and mixed with a single breath of air as it is taken into the lungs of the subject.

Figure 11:
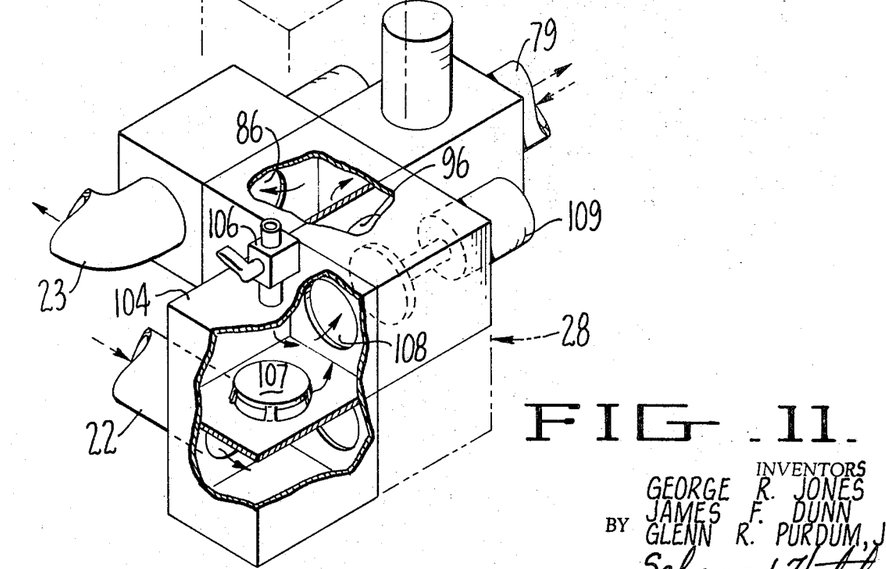
FIG. 11 is a view similar to those of FIGS. 8, 9, and 10 but showing still another component assembly.

FIG. 11 illustrates the portion of valving head 28 which makes it possible to carry out the hot bolus procedure. As here shown, the desired quantity of radioactive gas is injected into block 104 with a hypodermic needle (not shown) through a conventional injection valve device 106 designed for such purpose. Upon inhalation by the subject, air will be drawn from conduit 22, demand-responsive valve 107, valve 108, which has been allowed to open by energizing solenoid 109, and thence through opening 96 and connection 79 in the same manner as illustrated in FIG. 9.

Exhaled air passes through valve 86 to conduit 23 in like manner.

As an important feature of the present invention, radioactive tagged gas may be supplied to the patient through conduit 21, from a suitable source (not shown), or may be supplied in the form of a hot bolus as described above, or may be supplied from a recirculating hot gas system. The recirculating system makes possible a variety of procedures involving rebreathing of the radioactive tagged gas.

Figure 3:
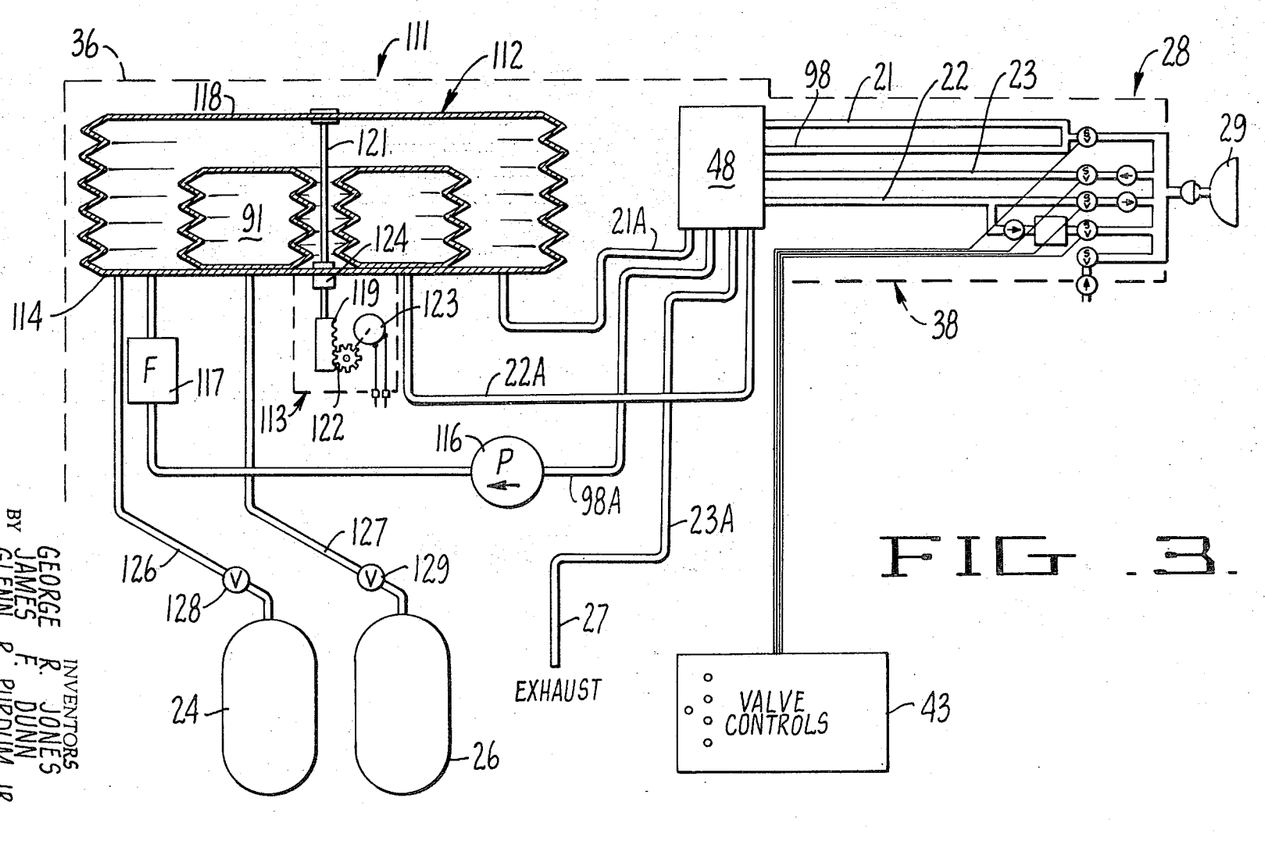
FIG.3 is a schematic view of a radioactive gas recirculating system forming part of the pulmonary inhalation device of the invention.

As shown in FIG. 3 of the drawings, the radioactive gas recirculating system of the present invention is here provided by the conduits 21 and 98, which are connected through the rotary knuckle joint 48 to corresponding conduits 21A and 98A. These conduits, in turn, are connected to a measuring means 111 capable of determining the quantity of gas inhaled from the circulating system by the subject 31.

As here shown, measuring means 111 comprises a variable volume container 112 interposed in the system, and a device 113 for measuring changes in the volume enclosed by the container 112. Preferably, and as here shown, container 112 consists of an expandable bellows mounted in cabinet section 36 and having its lower end 114 supported thereby. Constant recirculation of the radioactive tagged gas through the system is provided by a suitable pumping means 116 interposed in conduit 98A. If desired, a filtering device 117 may also be mounted in conduit 98A to remove carbon dioxide, or other undesired gases or vapors. So long as no gas is removed from the closed recirculating system, the upper end 118 of bellows 112 will not move, even though the gas is circulating around the system. However, any removal of gas from the recirculating system, as by inhalation by the subject, will cause bellows end 118 to move downwardly. The measuring device 113 is provided to measure the distance bellows end 118 drops, which will indicate the volume of gas removed from the recirculating system.

As here shown, the measuring device includes a rack gear 119 secured by a rod 121 to bellows end 118 for joint movement therewith. A pinion gear 122 is engaged with rack gear 119 and rotates in accordance with downward and upward movement of bellows end 118. Operatively connected to pinion 122 is a multiturn potentiometer 123 which operates the recording device 41 to indicate the timing and quantity of gas removed from the recirculating system.

Preferably, and as here shown, the non-radioactive gas reservoir 91 is of flexible wall construction and is mounted inside of bellows 112 so that removal of gas from reservoir 91 through conduit 22A will also cause bellows end 118 to drop so the rack and pinion 119, 122 will operate potentiometer 123 and cause the recording device 41 to indicate the volume of non-radioactive gas removed from reservoir 91.

As here shown, the reservoir 91 comprises a toroidal bellows concentrically mounted within bellows 112 and having the rod 121 passing downwardly through its central opening. A suitable gas tight sliding seal 124 is provided for rod 121 where it passes through the lower end 114 of bellows 112. Replenishment of the contents of bellows 112 and reservoir 91 is accomplished through conduits 126 and 127 connected through valves 128 and 129 to the radioactive gas and non-radioactive gas containers 24 and 26, respectively.

From the foregoing it will be seen that the pulmonary inhalation device of the present invention provides an apparatus capable of performing a wide variety of pulmonary function tests involving both radioactive and non-radioactive gases, with capacity for measurement of inhaled volumes of such gases, and desired valving sequencing, in a unitary and compact apparatus having provision for adjustment to the attitude of the subject with easily operated and convenient controls which hold the unit in the desired adjustment.

We claim:

1. A pulmonary inhalation device, comprising
a mask adapted to fit onto the face of a subject with the interior of the mask in sealed communication with the breathing passages of said subject,
a radioactive tagged gas circulating system containing radioactive gas therein and formed to supply radioactive tagged gas to the interior of said mask,
and valve means operatively connected to said mask and circulating system and formed for selectively allowing radioactive tagged gas to be breathed in from said circulating system by the subject and returned to said circulating system through said mask,
said radioactive tagged gas circulating system comprising measuring means for determining the quantity of gas inhaled from the circulating system by the subject,
said measuring means comprising a bellows, a mount securing an end of said bellows in fixed position, a rack gear secured to the other end of said bellows for movement therewith, a pinion gear engaged with said rack gear, and a multiturn potentiometer operatively connected to said pinion gear.

2. A pulmonary inhalation device comprising
a cabinet having a hollow interior,
a source of radioactive tagged gas within said hollow interior,
a first conduit connected to said source of radioactive tagged gas,
a reservoir of non-radioactive gas within said hollow interior,
a second conduit connected to said reservoir of non-radioactive gas,
a third conduit adapted for connection to exhaust,
a mask adapted to fit over the face of a subject with the interior of the mask in sealed communication with the breathing passages of said subject,
an arm connected to said cabinet and carrying said mask at one end,
and a valving means carried on said arm in communication with the interior of said mask and with said conduits and formed for selective connection of the interior of said mask to said conduits,
said arm being formed with a hollow interior and said conduits pass from the interior of the cabinet through the hollow interior of said arm to said valving means,
said arm also being movable relative to said cabinet and mounted with a pivotal attachment to said cabinet to swing about an axis, and swivel joints are provided in said conduits on said axis.

3. A pulmonary inhalation device as described in claim 2, and wherein rotary means is provided in the connection between said cabinet and said arm for rotation of the latter to provide for selective swinging adjustment of said arm in vertical and horizontal planes.

4. A pulmonary inhalation device as described in claim 2, and wherein height adjusting means is provided in the connection between said cabinet and said arm for effecting vertical movement of said arm and said pivotal attachment relative to said cabinet.

5. A pulmonary inhalation device as described in claim 3, and wherein height adjusting means is provided in the connection between said cabinet and said arm for effecting vertical movement of said arm and said pivotal attachment relative to said cabinet, and drive means is provided in said pivotal attachment and said rotary means and said height adjusting means, said drive means being formed for selectively moving said arm to a desired position and locking said arm in place.

6. A pulmonary inhalation device as described in claim 5 and wherein said drive means comprises individual worm gears.

7. A pulmonary inhalation device as described in claim 2, and wherein said cabinet is formed with a storage recess dimensioned to accommodate said arm, and said arm is selectively movable into and out of said recess.

8. A pulmonary inhalation device as described in claim 2, and wherein said source of radioactive tagged gas includes a closed recirculating system comprising a bellows mounted in said cabinet and having opposite ends formed for relative movement toward and away from each other in accordance with decreases and increases in gaseous contents of said bellows, and a potentiometer having an operative connection to said bellows and formed for indicating said relative movement of the ends of said bellows, said reservoir of non-radioactive gas being mounted inside said bellows and being of flexible wall construction to provide a displacement variable in accordance with the quantity of gas contained therein.

* * * * *